United States Patent
Sakomizu et al.

(10) Patent No.: US 10,475,313 B2
(45) Date of Patent: Nov. 12, 2019

(54) IMAGE PROCESSING SYSTEM AND IMAGE DECODING APPARATUS

(71) Applicant: Oki Electric Industry Co., Ltd., Tokyo (JP)

(72) Inventors: Kazuhito Sakomizu, Tokyo (JP); Toshihisa Nakai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 199 days.

(21) Appl. No.: 15/614,698

(22) Filed: Jun. 6, 2017

(65) Prior Publication Data
US 2018/0061199 A1 Mar. 1, 2018

(30) Foreign Application Priority Data
Aug. 23, 2016 (JP) .................... 2016-162408

(51) Int. Cl.
*G08B 13/196* (2006.01)
*H04N 19/17* (2014.01)
(Continued)

(52) U.S. Cl.
CPC . *G08B 13/19634* (2013.01); *G08B 13/19667* (2013.01); *H04N 7/181* (2013.01);
(Continued)

(58) Field of Classification Search
CPC ........ G08B 13/19634; G08B 13/19667; H04N 19/00; H04N 19/115; H04N 19/117;
(Continued)

(56) References Cited

U.S. PATENT DOCUMENTS

| | | | |
|---|---|---|---|
| 6,798,424 B2* | 9/2004 | Nakamura | H04N 19/23 345/629 |
| 7,162,095 B2* | 1/2007 | Chen | H04N 19/176 375/E7.029 |

(Continued)

FOREIGN PATENT DOCUMENTS

| JP | H4-219089 A | 8/1992 |
|---|---|---|
| JP | 2009-49979 A | 3/2009 |

*Primary Examiner* — Michael S Osinski
(74) *Attorney, Agent, or Firm* — Rabin & Berdo, P.C.

(57) ABSTRACT

To provide an image processing system and an image decoding apparatus that can limit compression ratio decrease and image quality deterioration and efficiently reduce an information amount.

An image processing system that compresses and transmits an input image signal including pixel values corresponding to respective pixels, including: a dynamic range compression unit configured to compress, by a predetermined coefficient, a dynamic range of each of the pixel values corresponding to a background region other than a region of interest (ROI) designated as a desired region for the pixel values in an image based on the input image signal, to generate a low dynamic range image signal; a coding compression unit configured to compress the low dynamic range image signal in accordance with a predetermined image coding scheme to generate compressed image data; and a bit stream transmitter configured to output a bit stream signal including ROI information, the predetermined coefficient and the compressed image data.

16 Claims, 11 Drawing Sheets

(51) Int. Cl.
*H04N 19/61* (2014.01)
*H04N 19/82* (2014.01)
*H04N 7/18* (2006.01)
*H04N 19/115* (2014.01)
*H04N 19/117* (2014.01)
*H04N 19/167* (2014.01)

(52) U.S. Cl.
CPC ......... *H04N 19/115* (2014.11); *H04N 19/117* (2014.11); *H04N 19/167* (2014.11); *H04N 19/17* (2014.11); *H04N 19/61* (2014.11); *H04N 19/82* (2014.11)

(58) Field of Classification Search
CPC ...... H04N 19/167; H04N 19/17; H04N 19/61; H04N 19/82; H04N 19/46; H04N 19/463; H04N 19/132; H04N 7/181; H04N 5/23229; G06T 5/007
See application file for complete search history.

(56) References Cited

U.S. PATENT DOCUMENTS

| | | | | |
|---|---|---|---|---|
| 7,177,358 | B2* | 2/2007 | Inomata | H04N 19/105 375/240.12 |
| 8,326,058 | B2* | 12/2012 | Taketa | H04N 19/647 382/232 |
| 8,599,209 | B2* | 12/2013 | Kameyama | H04N 7/17318 345/581 |
| 9,036,693 | B2* | 5/2015 | Isnardi | H04N 19/61 375/240.01 |
| 10,250,888 | B2* | 4/2019 | Jeong | H04N 19/136 |
| 10,306,233 | B2* | 5/2019 | Damkat | G09G 3/3426 |
| 2002/0118748 | A1* | 8/2002 | Inomata | H04N 19/105 375/240.04 |
| 2003/0007693 | A1* | 1/2003 | Yokose | G06T 3/4084 382/233 |
| 2004/0165086 | A1* | 8/2004 | Spitzer | G06T 5/20 348/239 |
| 2005/0286741 | A1* | 12/2005 | Watanabe | H04N 19/63 382/107 |
| 2006/0153288 | A1* | 7/2006 | Prochnow | H04N 19/51 375/240.01 |
| 2007/0147690 | A1* | 6/2007 | Ishiwata | H04N 19/61 382/232 |
| 2009/0059040 | A1* | 3/2009 | Kamon | H04N 5/217 348/241 |
| 2010/0118935 | A1* | 5/2010 | Kakii | H04N 7/147 375/240.01 |
| 2010/0119156 | A1 | 5/2010 | Noguchi et al. | |
| 2010/0284626 | A1* | 11/2010 | Maim | G06T 5/002 382/261 |
| 2011/0075944 | A1* | 3/2011 | Yuan | G06T 5/007 382/274 |
| 2012/0275718 | A1* | 11/2012 | Takamori | G06K 9/36 382/238 |
| 2013/0170540 | A1* | 7/2013 | Damkat | G09G 3/3426 375/240.01 |
| 2015/0109417 | A1* | 4/2015 | Zirnheld | H04N 13/106 348/46 |
| 2018/0061023 | A1* | 3/2018 | Nakamura | G06T 7/136 |
| 2018/0278985 | A1* | 9/2018 | De Haan | H04N 21/42653 |
| 2019/0020785 | A1* | 1/2019 | Yazawa | H04N 1/40012 |
| 2019/0089956 | A1* | 3/2019 | Stessen | H04N 1/6027 |
| 2019/0130542 | A1* | 5/2019 | Tichelaar | G06T 5/007 |

* cited by examiner

IMAGE PROCESSING SYSTEM AND IMAGE DECODING APPARATUS

CROSS REFERENCE TO RELATED APPLICATION(S)

This application is based upon and claims benefit of priority from Japanese Patent Application No. 2016-162408, filed on Aug. 23, 2016, the entire contents of which are incorporated herein by reference.

BACKGROUND

The present invention relates to an image processing system that compressively codes image signals and an image decoding apparatus that decodes compressively coded image signals.

Recently, surveillance cameras have become more common, and higher resolution, higher frame rates and more viewpoints have been required. However, higher resolution, higher frame rates and multiple viewpoints cause the amount of moving image data to remarkably increase, raising communication costs and storage costs.

To solve this problem, an image processing apparatus that performs image compression processing by detecting a specific region in which, for example, a "face" is displayed from a moving image as a region of interest (ROI) and allocating a large number of bits to the ROI has been proposed (see JP 2009-49979A, for example).

The image processing apparatus reduces a data amount by controlling parameters applied to a compression unit to decrease an information amount of regions other than the ROI, that is, background regions, below an information amount of the ROI using a function of the compression unit which sets parameters for controlling a code amount and video quality for each block.

However, there are cases in which such a parameter control function cannot be added later when the compression unit is configured as hardware.

Accordingly, there has been proposed an image coding apparatus that reduces an information amount of a background region by performing a filtering process using a low pass filter on the background region to remove information of high frequency components in order to decrease the information amount of the background region without depending on a compression unit (see JP H4-219089A, for example). This image coding apparatus limits generation of artifacts at block boundaries while decreasing an information amount of image signals through filtering by the low pass filter.

SUMMARY

Incidentally, the aforementioned reduction of high frequency components by the low pass filter corresponds to a process of reducing an information amount by decreasing amplitudes of high frequency components in the form of a transform domain through a fast Fourier transform (FFT) process, for example, for the entire image.

Meanwhile, an image coding scheme mostly employed in the compression unit reduces an information amount by decreasing amplitudes of image signals through a combination of quantization by division and inverse quantization by multiplication instead of the form of the transform domain.

Accordingly, when both the low pass filter and the compression unit decrease amplitudes of image signals to the same level, that is, decrease the information amount by the same degree, there is a tendency for a peak signal to noise ratio (PSNR) of video signals in the background region to decrease when the information amount is reduced by the low pass filter.

That is, in reduction of the information amount of the background region by the low pass filter without depending on the compression unit, when the compression unit and the low pass filter perform compression at the same bit rate, the PSNR of the background region decreases due to an information amount reduction process difference.

In this case, in order to increase the PSNR of the background region, it is necessary to decrease compression bit rates in the compression unit and the low pass filter, that is, to decrease a reduction amount of the information amount.

Meanwhile, when a video signal obtained by a surveillance camera is a processing target, artifacts in a background region do not become a problem, and thus it is desirable to reduce an information amount rather than increase a PSNR.

Accordingly, when a desired PSNR is assumed as the PSNR of the background region and the low pass filter reduces the information amount of the background region, it may be impossible to increase a compression ratio.

Therefore, it is desirable to limit compression ratio decrease and image quality deterioration and efficiently reduce an information amount.

An image processing system according to an embodiment of the present invention that compresses and transmits an input image signal including pixel values corresponding to respective pixels, includes: a dynamic range compression unit configured to compress, by a predetermined coefficient, a dynamic range of each of the pixel values corresponding to a background region other than a region of interest (ROI) designated as a desired region for the pixel values in an image based on the input image signal, to generate a low dynamic range image signal; a coding compression unit configured to compress the low dynamic range image signal in accordance with a predetermined image coding scheme to generate compressed image data; and a bit stream transmitter configured to output a bit stream signal including ROI information indicating a position of the ROI in the image, the predetermined coefficient and the compressed image data.

The image processing system may include: an ROI detection unit configured to detect a region in which a predetermined object is displayed in the image based on the input image signal as the ROI and to generate the ROI information indicating the position of the ROI in the image. The dynamic range compression unit may regard a region other than the ROI detected by the ROI detection unit in the image as the background region.

The image processing system may include: an ROI correction unit configured to correct the ROI information. The ROI correction unit may correct all pixels belonging to a block into pixels belonging to the ROI when predetermined N or more pixels among the pixels belonging to the block belong to the ROI, for each block composed of neighboring pixels in the image.

The image processing system may include: a coefficient calculation unit configured to receive a dynamic range setting value for designating a dynamic range and to calculate the predetermined coefficient on the basis of the dynamic range setting value.

The image processing system may include: a compression target selection unit configured to select one of the low dynamic range image signal and a predictive image signal and to supply the selected one to the coding compression unit as a data-amount-suppressed image signal; and a buffer configured to accept and retain the data-amount-suppressed image signal and to supply the retained data-amount-suppressed image signal to the compression target selection unit as the predictive image signal after one picture period. The coding compression unit may compress the data-amount-suppressed image signal in accordance with the predetermined image coding scheme.

The compression target selection unit may determine whether a difference between the low dynamic range image signal and the predictive image signal is less than a predetermined threshold value for blocks classified as the background region from among blocks each composed of neighboring pixels in the image, select the predictive image signal for a block for which the difference is determined to be less than the predetermined threshold value, and select the low dynamic range image signal for a block for which the difference is determined to be equal to or greater than the predetermined threshold value.

The image processing system may include: a threshold value decision unit configured to receive a threshold setting value indicating a threshold value to be set and to calculate the predetermined threshold value on the basis of the threshold setting value and the predetermined coefficient.

The dynamic range compression unit may generate the low dynamic range image signal by multiplying pixel values of pixels classified as the background region from among the pixel values by the predetermined coefficient.

When a pixel value of a pixel classified as the background region is Pb, a pixel value after dynamic range compression is Pa, the predetermined coefficient is Dc, and a center value of dynamic range compression is C, the dynamic range compression unit may calculate the pixel value Pa after dynamic range compression in accordance with the following expression.

$$Pa=(Pb-C)\times Dc+C$$

The image processing system may include: a center value decision unit configured to receive center value decision data for designating a center value of a dynamic range and to decide the center value C on the basis of the input image signal, the center value decision data or information about the ROI. The dynamic range compression unit may compress a dynamic range with the center value C as a center. The bit stream transmitter may output a bit stream signal including the center value C along with the information about the ROI, the predetermined coefficient and the compressed image data.

The center value decision unit may regard the center value designated by the center value decision data as the center value C.

The center value decision unit may regard a representative value of a pixel value group composed of pixel values corresponding to respective pixels included in a corresponding block, as the center value C for each block in the input image signal.

The center value decision unit may regard a representative value of a pixel value group of pixels belonging to the background region from among pixels included in a corresponding block as the center value C for each block in the input image signal.

The center value decision unit may regard a representative value of a pixel value group of pixels belonging to the ROI from among pixels included in a corresponding block as the center value C for each block in the input image signal.

Further, an image decoding apparatus according to an embodiment of the present invention is an image decoding apparatus that decodes a bit stream signal including: ROI information indicating a position of an ROI, in which a predetermined object is displayed in an image based on an image signal, in the image; compressed image data obtained by compressing a low dynamic range image signal, in which a dynamic range of each of pixel values corresponding to a background region other than the ROI designated as a desired region has been compressed, by a predetermined coefficient in accordance with a predetermined image coding scheme, for pixel values of the pixel values included in the image signal when a region other than the ROI in the image is the background region; and the predetermined coefficient, the image decoding apparatus including: a bit stream receiver configured to receive the bit stream signal and to extract the compressed image data, ROI information indicating a position of the ROI in the image, and the predetermined coefficient from the bit stream signal; a decoder configured to perform decompression processing corresponding to the image coding scheme on the compressed image data to generate a data-amount-suppressed image signal; and a dynamic range decompression unit configured to decompress dynamic ranges by multiplying pixel values corresponding to pixels classified as the background region in the ROI information, from among pixel values represented by the data-amount-suppressed image signal, by a reciprocal of the predetermined coefficient, to restore the image signal.

The dynamic range decompression unit may restore the image signal by performing dynamic range decompression processing on pixel values included in the data-amount-suppressed image signal. When a pixel value before the decompression processing is Qb, a pixel value after the decompression processing is Qa, the predetermined coefficient is Dc and a center value of dynamic range compression is V, the pixel value Qa after the decompression processing may be calculated by the following expression.

$$Qa=(Qb-V)\times(1/Dc)+V$$

The dynamic range decompression unit may restore the image signal by performing dynamic range decompression processing based on a predetermined center value on pixel values included in the data-amount-suppressed image signal. When a pixel value before the decompression processing is Qb, a pixel value after the decompression processing is Qa, the predetermined coefficient is Dc and a center value of the dynamic range compression is V, the pixel value Qa after the decompression processing may be calculated by the following expression.

$$Qa=(Qb-V)\times(1/Dc)+V$$

Further, an image processing system according to an embodiment of the present invention that compresses and transmits an input image signal including pixel values corresponding to respective pixels, includes: a dynamic range compression unit configured to compress, by a predetermined coefficient, a dynamic range of each of the pixel values corresponding to a background region other than a region of interest (ROI) designated as a desired region for the pixel values in an image based on the input image signal, to generate a low dynamic range image signal; a compression target selection unit configured to select one of the low dynamic range image signal and a predictive image signal and to output the selected one as a data-amount-suppressed image signal; a buffer configured to accept and retains the data-amount-suppressed image signal and to supply the retained data-amount-suppressed image signal to the compression target selection unit as the predictive image signal after one picture period; a coding compression unit configured to compress the data-amount-suppressed image signal in accordance with a predetermined image coding scheme to generate compressed image data; and a bit stream transmitter configured to output a bit stream signal including ROI information indicating a position of the ROI in the image, the predetermined coefficient and the compressed image data.

The compression target selection unit may determine whether a difference between the low dynamic range image signal and the predictive image signal is less than a predetermined threshold value for blocks classified as the background region from among blocks each composed of neighboring pixels in the image, selects the predictive image signal for a block for which the difference is determined to be less than the predetermined threshold value, and selects the low dynamic range image signal for a block for which the difference is determined to be equal to or greater than the predetermined threshold value.

In an embodiment of the present invention, an information amount is reduced by targeting a background region other than a specific region (ROI) in an image represented by an image signal and providing the dynamic range compression unit that compresses a dynamic range of each of pixel values corresponding to the background region along with the compression unit that compresses the image signal in accordance with a predetermined image coding scheme. Accordingly, image quality deterioration after decoding can be limited and an information reduction amount can be increased. Therefore, it is possible to limit image quality deterioration and efficiently reduce an information amount according to the embodiment of the present invention.

DETAILED DESCRIPTION OF THE EMBODIMENT(S)

Figure 1:
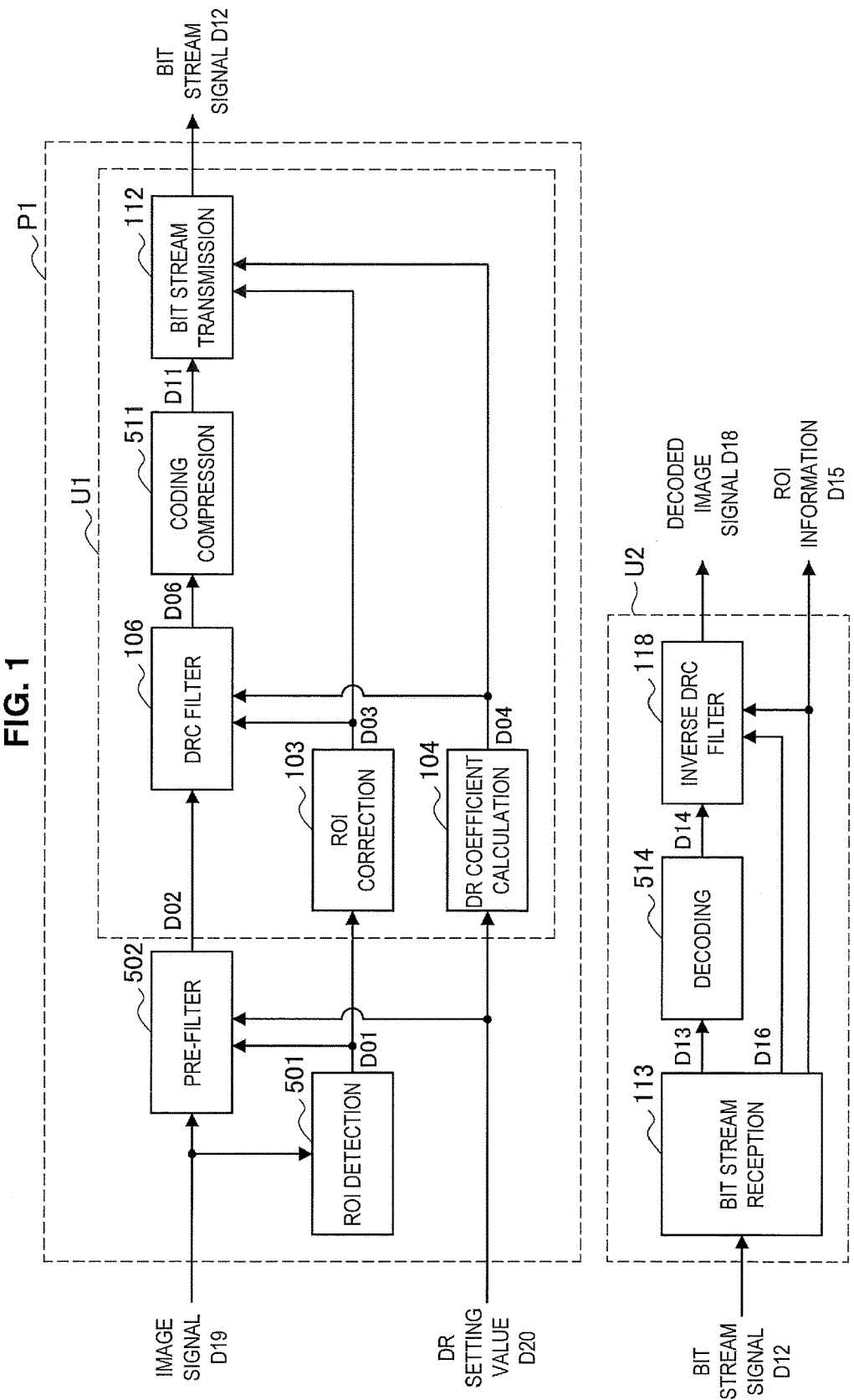
FIG. 1 is a block diagram illustrating a configuration of a first embodiment of an image processing system P1 and an image decoding unit U2.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Embodiment 1

FIG. 1 is a block diagram illustrating a configuration of an image processing system P1 and an image decoding unit U2 according to an embodiment of the present invention. The image processing system P1 includes a region-of-interest (ROI) detection unit 501, a pre-filter unit 502 and an image coding unit U1.

The ROI detection unit 501 detects a region in which a specific object such as a "face" is displayed in an image frame as an ROI, that is, a region of interest, designated as a desired region for a plurality of pixel values by applying a face detection algorithm, for example, on the basis of an image signal D19 including a series of pixel values indicating luminance levels of pixels. In addition, the ROI detection unit 501 supplies ROI information D01 indicating the position of the detected ROI in an image to the image coding unit U1 and the pre-filter unit 502.

The pre-filter unit 502 receives the image signal D19, the ROI information D01, and a DR setting value D20 indicating a dynamic range (abbreviated hereinafter as DR) after compression. The pre-filter unit 502 generates an image signal D02 by performing image smoothing on pixel values classified as a background region in the ROI information D01 from among pixel values indicating luminance levels of pixels represented by the image signal D19. For example, the pre-filter unit 502 convolutes the pixel values classified as the background region through a Gaussian filter process to generate the image signal D02 in which high frequency components have been suppressed. The pre-filter unit 502 supplies the image signal D02 to the image coding unit U1.

The image coding unit U1 compresses the image signal D02 on the basis of the ROI information D01 and the DR setting value D20 and outputs a bit stream signal D12.

The image coding unit U1 includes an ROI correction unit 103, a DR coefficient calculation unit 104, a dynamic range control (DRC) filter 106, a bit stream transmitter 112 and a coding compression unit 511.

The ROI correction unit 103 corrects the ROI information D01 and supplies ROI-corrected information D03 to the DRC filter 106 and the bit stream transmitter 112.

The DR coefficient calculation unit 104 calculates a DR coefficient D04 on the basis of the DR setting value D20 that designates a dynamic range and supplies the DR coefficient D04 to the DRC filter 106 and the bit stream transmitter 112. Here, the value indicated by the DR coefficient D04 is less than 1.

The DRC filter 106 multiplies pixel values corresponding to pixels classified as the background region in the ROI-corrected information D03, in a sequence of pixel values represented by the image signal D02, by the DR coefficient D04 to generate a low DR image signal D06. Here, the value indicated by the DR coefficient D04 is less than 1. Accordingly, the dynamic range of each of the pixel values corresponding to the background region is compressed at a compression ratio based on the DR coefficient D04 through multiplication of the pixel values corresponding to the pixels classified as the background region by the DR coefficient D04. On the other hand, with respect to a sequence of pixel values corresponding to pixels classified as the ROI, the DRC filter 106 outputs the sequence of pixel values as the low DR image signal D06.

The DRC filter 106 supplies the low DR image signal D06 to the coding compression unit 511.

The coding compression unit 511 compresses the low DR image signal D06 using an image coding scheme such as Joint Photographic Experts Group (JPEG), H.264/Moving Image Experts Group (MPEG)-4 Advanced Video Coding (AVC) or H.265/MPEG-H High Efficiency Video coding (HEVC) to generate compressed image data D11 and supplies the compressed image data D11 to the bit stream transmitter 112. Further, when the low DR image signal D06 supplied from the DRC filter 106 is identical to a low DR image signal D06 supplied one picture period before the low DR image signal D06, the coding compression unit 511 transitions to a special mode called a skip mode. In the skip mode, the coding compression unit 511 reduces an information amount by coding an image signal such that redundant differential information transmission is suppressed.

The bit stream transmitter 112 multiplexes the ROI-corrected information D03, the DR coefficient D04 and the compressed image data D11 to generate a bit stream signal D12 and outputs the bit stream signal D12 to the outside.

The image decoding unit U2 that receives the bit stream signal D12 and performs image decoding processing on the bit stream signal D12 includes a bit stream receiver 113, a decoder 514 and an inverse DRC filter 118.

The bit stream receiver 113 receives the bit stream signal D12 and extracts compressed image data, ROI information and a DR coefficient from the bit stream signal D12. The bit stream receiver 113 supplies the extracted compressed image data to the decoder 514 as compressed image data D13, and supplies the extracted DR coefficient to the inverse DRC filter 118 as a DR coefficient D16. Further, the bit stream receiver 113 supplies the extracted ROI information to the inverse DRC filter 118 as ROI information D15, and outputs the ROI information D15 to the outside.

The decoder 514 performs decoding processing corresponding to the image coding scheme employed by the coding compression unit 511, such as JPEG, H.264/MPEG-4 AVC or H.265/MPEG-H HEVC, on the compressed image data D13 to decompress the compressed state thereof, thereby generating a data-amount-suppressed image signal D14. The decoder 514 supplies the data-amount-suppressed image signal D14 to the inverse DRC filter 118.

The inverse DRC filter 118 multiplies the pixel values of the pixels classified as the background region in the ROI information D15, in a sequence of pixel values included in the data-amount-suppressed image signal D14, by a reciprocal of the DR coefficient D16 to generate a decoded image signal D18 having decompressed dynamic ranges and outputs the decoded image signal D18 to the outside.

In the configuration illustrated in FIG. 1, the ROI-corrected information D03 and the DR coefficient D04 are multiplexed and transmitted from the image coding unit U1 to the image decoding unit U2. However, the ROI information D01 and the DR setting value D20 may be transmitted from the image coding unit U1 to the image decoding unit U2 and the image decoding unit U2 may perform the same processes as the ROI correction unit 103 and the DR coefficient calculation unit 104 do to obtain the ROI-corrected information D03 and the DR coefficient D04. In addition, although the ROI detection unit 501 dynamically detects the ROI information D01 from the image signal D19 in the above description, the ROI information may be set by a static means, for example, for manually fixing the ROI information in advance and the like. Furthermore, although the image signal D02 corresponding to the output of the pre-filter unit 502 is supplied to the image coding unit U1 in the configuration illustrated in FIG. 1, the image signal D19 may be directly supplied to the image coding unit U1.

Hereinafter, operations with respect to the configuration illustrated in FIG. 1 will be described.

Figure 2:
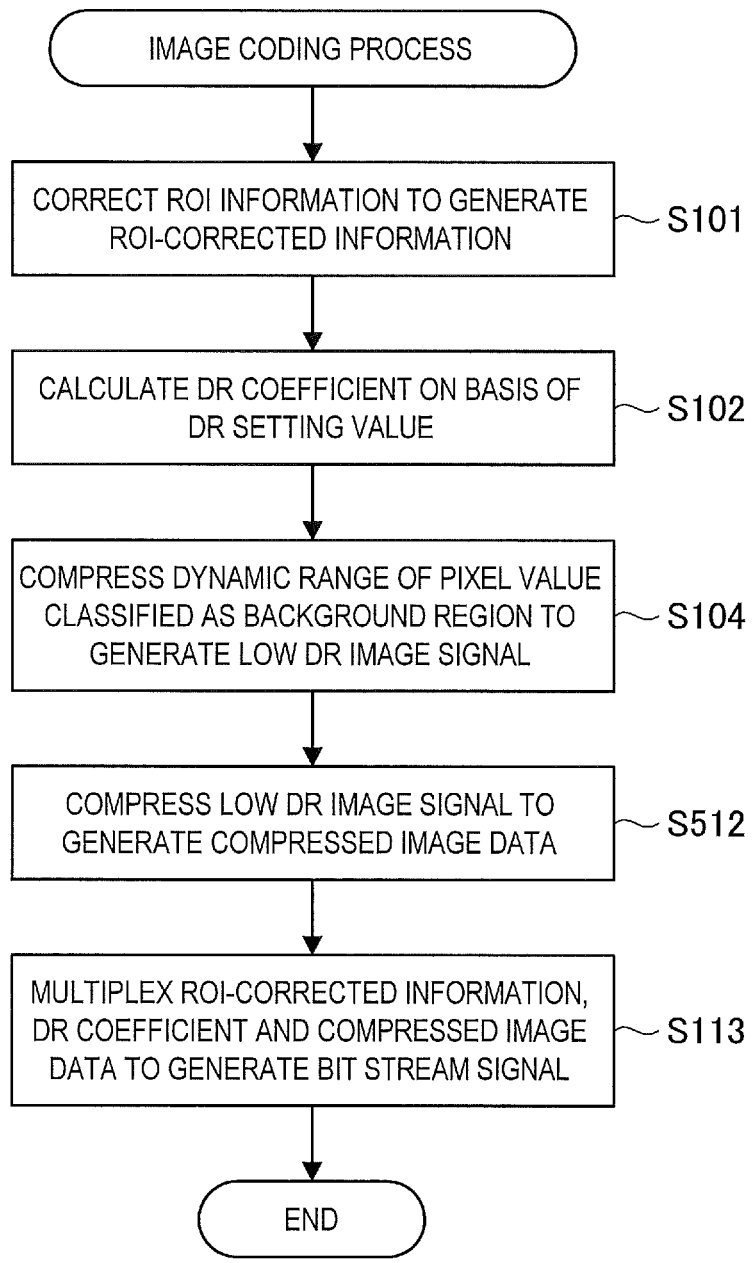
FIG. 2 is a flowchart illustrating an operation of an image coding unit U1.

FIG. 2 is a flowchart illustrating an operation of the image coding unit U1. As illustrated in FIG. 2, in the image coding unit U1, first of all, the ROI correction unit 103 corrects the ROI information D01 by performing one of normalization processes 1 to 3 below on the ROI information D01 to generate the ROI-corrected information D03 (step S101).

(Normalization Process 1)

In the normalization process 1, the ROI correction unit 103 determines for each block having a predetermined size whether at least one of a plurality of pixels belonging to the block is included in the ROI, on the basis of the ROI-corrected information D03, and regards all pixels belonging to the block as a pixel group belonging to the ROI when the at least one of the plurality of pixels belonging to the block is determined to be included in the ROI. Additionally, one block is composed of n·m (n and m being integers equal to or greater than 2) pixels in neighboring n rows×m columns.

(Normalization Process 2)

In the normalization process 2, the ROI correction unit 103 determines for each block having a predetermined size whether half or more of a plurality of pixels belonging to the block are included in the ROI, on the basis of the ROI-corrected information D03, and regards all pixels belonging to the block as a pixel group belonging to the ROI when half or more of the pixels belonging to the block are determined to be included in the ROI.

(Normalization Process 3)

In the normalization process 3, the ROI correction unit 103 determines for each block having a predetermined size whether all pixels belonging to the block are included in the ROI on the basis of the ROI-corrected information D03, and regards all pixels belonging to the block as a pixel group belonging to the ROI when all pixels belonging to the block are determined to be included in the ROI.

Figure 3:
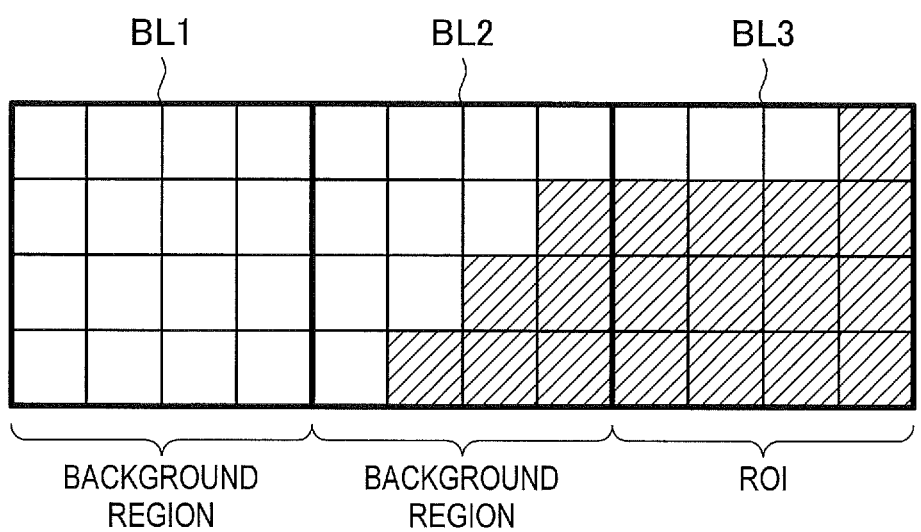
FIG. 3 is a diagram for describing an example of a normalization operation by a normalization process 2.

FIG. 3 is a diagram for describing an example of a normalization operation according to the normalization process 2. FIG. 3 shows blocks BL1 to BL3 each of which has a size of 4 pixels (in a row direction)×4 pixels (in a column direction) and thus includes 16 pixels. In FIG. 3, hatched pixels are pixels determined to be included in an ROI before normalization. Here, there is no pixel included in the ROI in the block BL 1 and thus all pixels belonging to the block BL1 are handled as pixels corresponding to a background region. Further, there are 6 pixels included in the ROI in the block BL2 illustrated in FIG. 3 and the number of pixels included in the ROI does not reach 8 corresponding to half of 16, and thus all pixels belonging to the block BL2 are also handled as pixels corresponding to the background region. In addition, the block BL3 illustrated in FIG. 3 includes 8 or more pixels belonging to the ROI and thus all pixels belonging to the block BL3 are handled as pixels corresponding to the ROI.

In this manner, the ROI correction unit 103 normalizes the ROI information D01 to match the boundary between the ROI and the background region with a block boundary employed by the image coding scheme. Since the image coding scheme employed by the coding compression unit 511 reduces an information amount by performing prediction or transformation on each block having a specific size, it is desirable to match the boundary between the ROI and the background region with the block boundary employed by the image coding scheme. Further, the ROI correction unit 103 may supply the input ROI information D01 to the DRC filter 106 and the bit stream transmitter 112 as the ROI-corrected information D03 because effects of the embodiment of the present invention are obtained without correcting the ROI information.

Then, the DR coefficient calculation unit 104 calculates the DR coefficient D04 on the basis of the DR setting value D20 (step S102).

Specifically, when a dynamic range of a pixel value in the image signal D19 is Dt and a dynamic range designated by the DR setting value D20 is Dp, for example, the DR coefficient calculation unit 104 calculates a coefficient Dc as the DR coefficient D04 in accordance with the following expression.

$$Dc=Dp/Dt$$

Here, for example, when the dynamic range Dt of a pixel value in the image signal D19 is 256 and the dynamic range Dp after compression is 128, Dc is 0.5.

When Dc is directly supplied to the image coding unit U1 as the DR setting value D20, the DR coefficient calculation unit 104 may supply the DR setting value D20 as the DR coefficient D04 to the DRC filter 106 and the bit stream transmitter 112.

Then, the DRC filter 106 multiplies pixel values corresponding to pixels classified as the background region in the ROI-corrected information D03, in a sequence of pixel values included in the image signal D02, by the DR coefficient D04 to generate the low DR image signal D06 having decompressed dynamic ranges (step S104).

Specifically, when a pixel value before dynamic range compression is Pb and a pixel value after dynamic range compression is Pa, the DRC filter 106 multiplies the pixel value Pb by the DR coefficient Dc to obtain Pa in accordance with the following expression, for example.

$$Pa=Pb\times Dc$$

That is, the DRC filter 106 obtains the pixel value Pa as a pixel value after compression for the pixel value Pb corresponding to a pixel classified as the background region and regards the pixel value Pb before compression as a pixel value after compression for pixel values corresponding to pixels classified as the ROI. Then, the DRC filter 106 generates the low DR image signal D06 including a series of pixel values (Pa or Pb) after compression.

Incidentally, there are cases in which pixel values are distributed with "128," for example, as a center, like a chrominance signal. In such a case, the DRC filter 106 may calculate the pixel value Pa after dynamic range compression in accordance with the following expression using a predetermined constant C. Here, dynamic range compression is performed with the constant C as a center.

$$Pa=(Pb-C)\times Dc+C$$

Next, the coding compression unit 511 compresses the low DR image signal D06 using an image coding scheme such as JPEG, H.264/MPEG-4 AVC or H.265/MPEG-H HEVC to generate the compressed image data D11 (step S512).

Then, the bit stream transmitter 112 multiplexes information such as the ROI-corrected information D03, the DR coefficient D04 and the compressed image data D11 to generate the bit stream signal D12 and outputs the bit stream signal D12 to the outside (step S113).

Hereinafter, the operation of the image decoding unit U2 receiving the bit stream signal D12 and performing image decoding processing on the bit stream signal D12 will be described.

Figure 4:
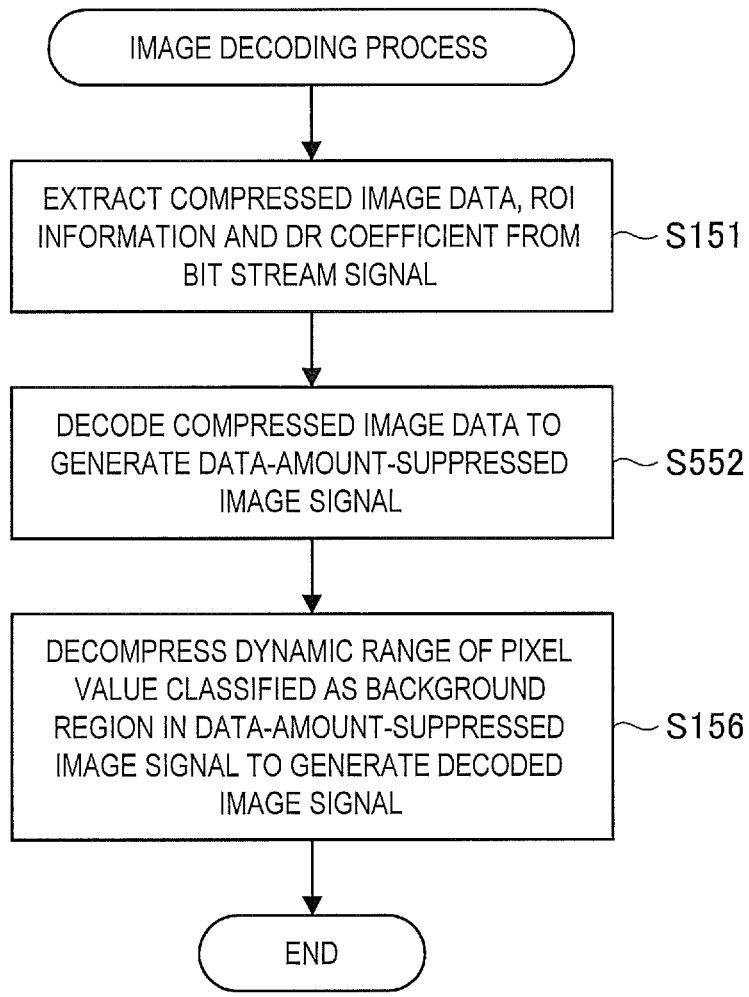
FIG. 4 is a flowchart illustrating an operation of the image decoding unit U2.

FIG. 4 is a flowchart illustrating the operation of the image decoding unit U2. As illustrated in FIG. 4, in the image decoding unit U2, first of all, the bit stream receiver 113 receives the bit stream signal D12, extracts compressed image data, ROI information and a DR coefficient from the bit stream signal D12 and outputs the compressed image data, the ROI information and the DR coefficient as the compressed image data D13, the ROI information D15 and the DR coefficient D16, respectively (step S151).

Then, the decoder 514 in the image decoding unit U2 decodes the compressed image data D13 using an image decoding scheme such as H.264/MPEG-4 AVC to generate the data-amount-suppressed image signal D14 (step S552).

Thereafter, the inverse DRC filter 118 in the image decoding unit U2 multiplies pixel values corresponding to pixels classified as the background region in the ROI information D15, in a sequence of pixel values included in the data-amount-suppressed image signal D14, by a reciprocal of the DR coefficient D16 to generate the decoded image signal D18 having decompressed dynamic ranges and outputs the decoded image signal D18 (step S156).

Specifically, when a pixel value before dynamic range decompression is Qb and a pixel value after dynamic range decompression is Qa, the inverse DRC filter 118 divides Qb by the DR coefficient Dc to obtain Qa as expressed by the following expression, for example.

$$Qa=Qb\times(1/Dc)$$

That is, the inverse DRC filter 118 regards Qa as the pixel value after decompression for pixel values corresponding to pixels classified as the background region and regards Qb as the pixel value after decompression for pixels classified as the ROI. Then, the inverse DRC filter 118 outputs the decoded image signal D18 including a sequence of pixel values (Qa and Qb) after decompression.

Further, when the DRC filter 106 compresses dynamic ranges with the constant C as a center, the inverse DRC filter 118 also decompresses the dynamic ranges using the following expression.

$$Qa=(Qb-C)\times(1/Dc)+C$$

As described above, the image processing system P1 illustrated in FIG. 1 compresses and transmits the input image signal (D19) including a plurality of pixel values corresponding to pixels, and includes the following ROI detection unit, dynamic range compression unit, coding compression unit and bit stream transmitter. That is, the ROI detection units (103 and 501) detect a region in which a predetermined object is displayed in an image based on the input image signal as an ROI and generate ROI information (D01 and D03) indicating the position of the ROI in the image. The dynamic range compression units (104 and 106) regard a region other than the ROI in the image as a background region and compress a dynamic range of a pixel value corresponding to the background region from among a plurality of pixel values based on the input image signal by a predetermined coefficient (D04) to generate a low dynamic range image signal (D06). The coding compression unit (511) compresses the low dynamic range image signal in accordance with a predetermined image coding scheme (e.g., JPEG, MPEG or the like) to generate compressed image data (D11). Then, the bit stream transmitter (112) outputs a bit stream signal including the ROI information, the predetermined coefficient and the compressed image data.

In short, in the image processing system P1, an information amount is reduced by providing the dynamic range compression unit for compressing a dynamic range of each pixel value corresponding to a background region other than an ROI in an image represented by the image signal along with the coding compression unit for compressing an image signal in accordance with a predetermined image coding scheme. Accordingly, it is possible to limit image quality deterioration after decoding and increase an information reduction amount, compared to a case in which a low pass filter is used to decrease amplitudes of high frequency components in the entire background region in the form of a transform domain in order to reduce the information amount of the background region. That is, in the image processing system P1 illustrated in FIG. 1, it is possible to limit image quality deterioration and efficiently decrease an information amount by providing the dynamic range compression units (103, 104, 106 and 501) outside the compression unit (511) for compressing an image signal in accordance with a predetermined image coding scheme.

Embodiment 2

Figure 5:
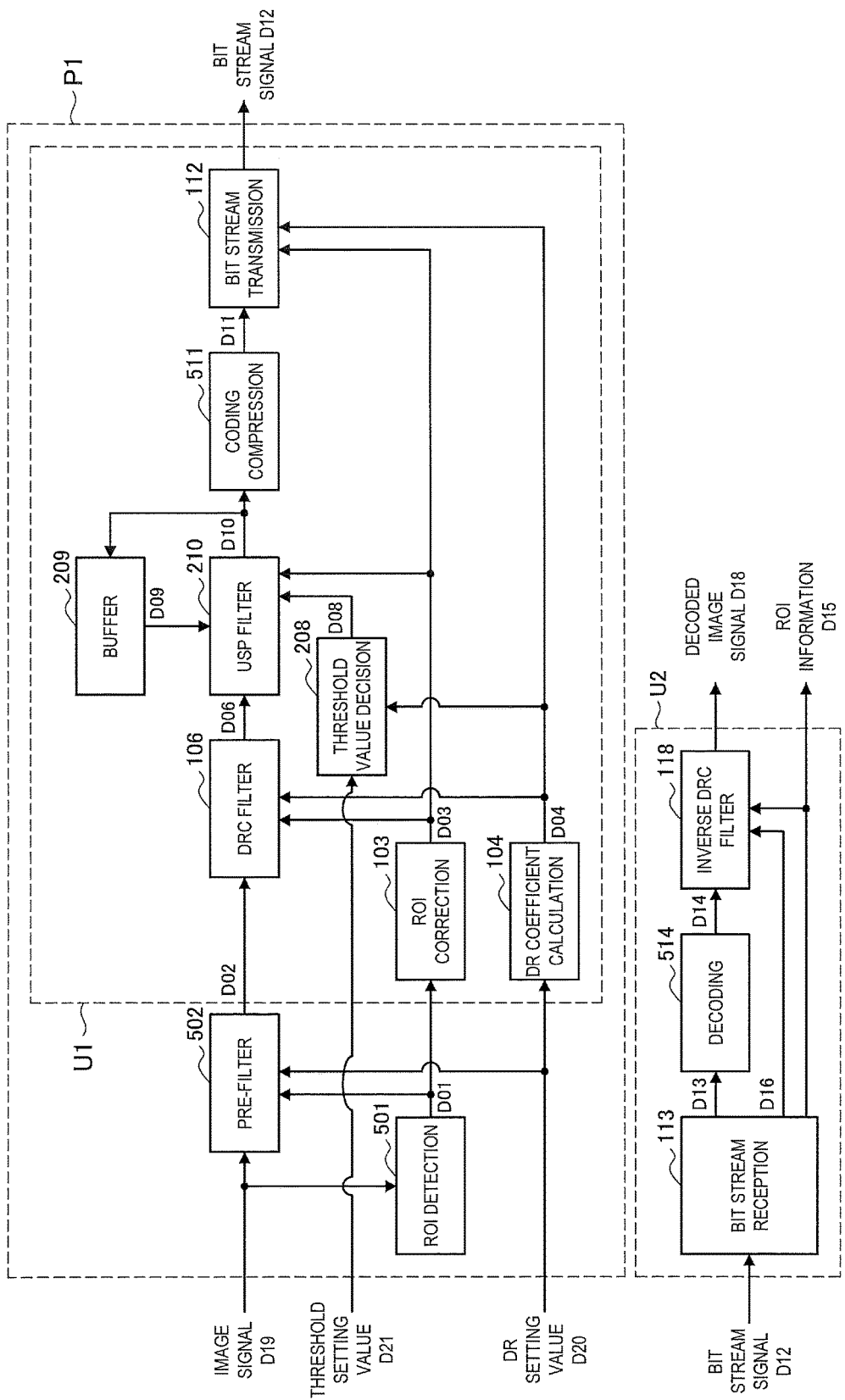
FIG. 5 is a block diagram illustrating a configuration of a second embodiment of the image processing system P1 and the image decoding unit U2.

FIG. 5 is a block diagram illustrating a configuration of a second embodiment of the image processing system P1 and the image decoding unit U2. In FIG. 5, the image decoding unit U2 is the same as that illustrated in FIG. 1 and thus description of the configuration and operation of the image decoding unit U2 is omitted. In addition, the configuration of the image processing system P1 illustrated in FIG. 5 is the same as that illustrated in FIG. 1 except that a threshold value decision unit 208, a buffer 209 and an update source image (USP) filter 210 are newly installed and a threshold setting value D21 is newly supplied. However, in the configuration illustrated in FIG. 5, the DRC filter 106 supplies the low DR image signal D06 to the USP filter 210 instead of the coding compression unit 511. Hereinafter, the configuration illustrated in FIG. 5 will be described chiefly for the threshold value decision unit 208, the buffer 209 and the USP filter 210.

The threshold value decision unit 208 calculates a threshold value D08 on the basis of the threshold setting value D21 and the DR coefficient D04 and supplies the threshold value D08 to the USP filter 210.

The USP filter 210 selects one of a predictive image signal D09 supplied from the buffer 209 and the low DR image signal D06 on the basis of the ROI-corrected information D03 and the threshold value D08 and supplies the selected one to the coding compression unit 511 and the buffer 209 as a data-amount-suppressed image signal D10.

The buffer 209 accepts and retains the data-amount-suppressed image signal D10 and supplies the data-amount-suppressed image signal D10 to the USP filter 210 as a predictive image signal D09 after one picture period. When the coding compression unit 511 has a function of decoding the compressed image data D11 to release the compressed state thereof and output a local decoded image signal, the buffer 209 may accept and retain the local decoded image signal instead of the data-amount-suppressed image signal D10. Accordingly, here, the buffer 209 supplies the retained local decoded image signal to the USP filter 210 as the predictive image signal D09.

Hereinafter, detailed operations with respect to the configuration illustrated in FIG. 5 will be described.

Figure 6:
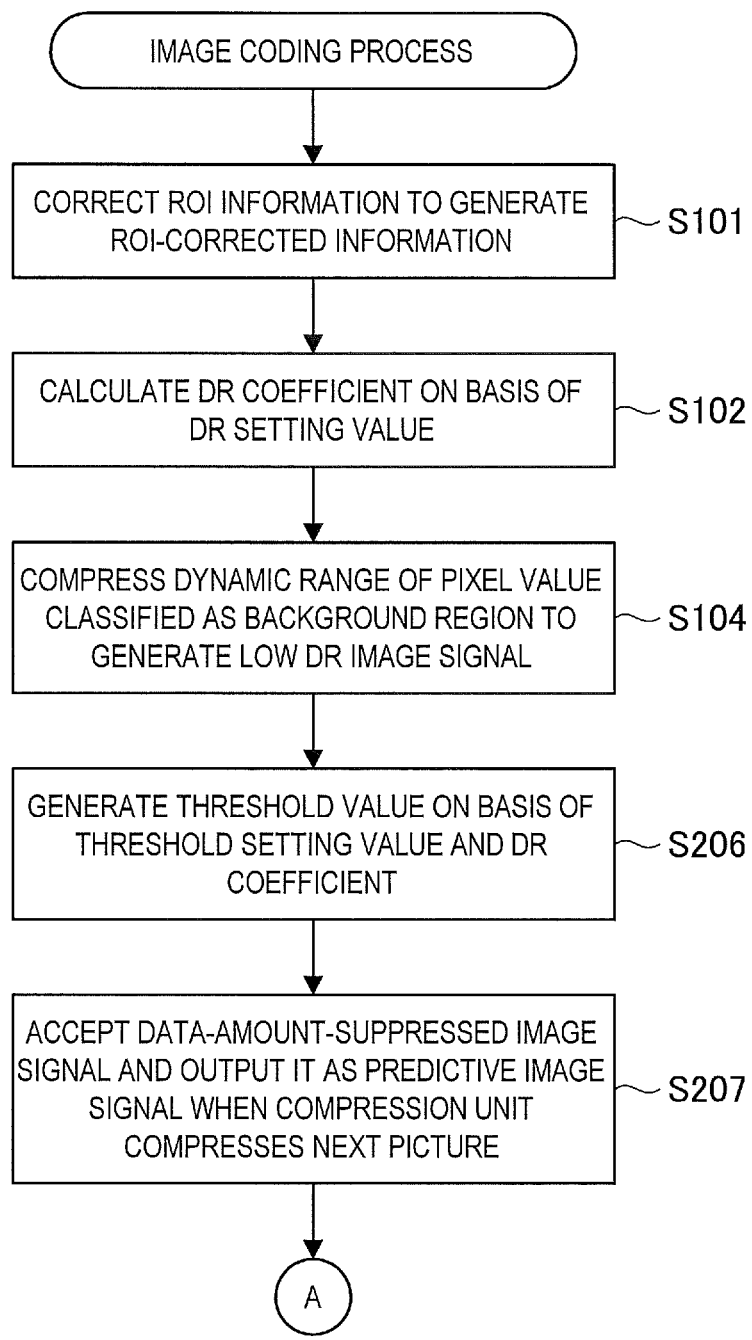
FIG. 6 is a flowchart illustrating an operation of the image coding unit U1 shown in FIG. 5.
Figure 7:
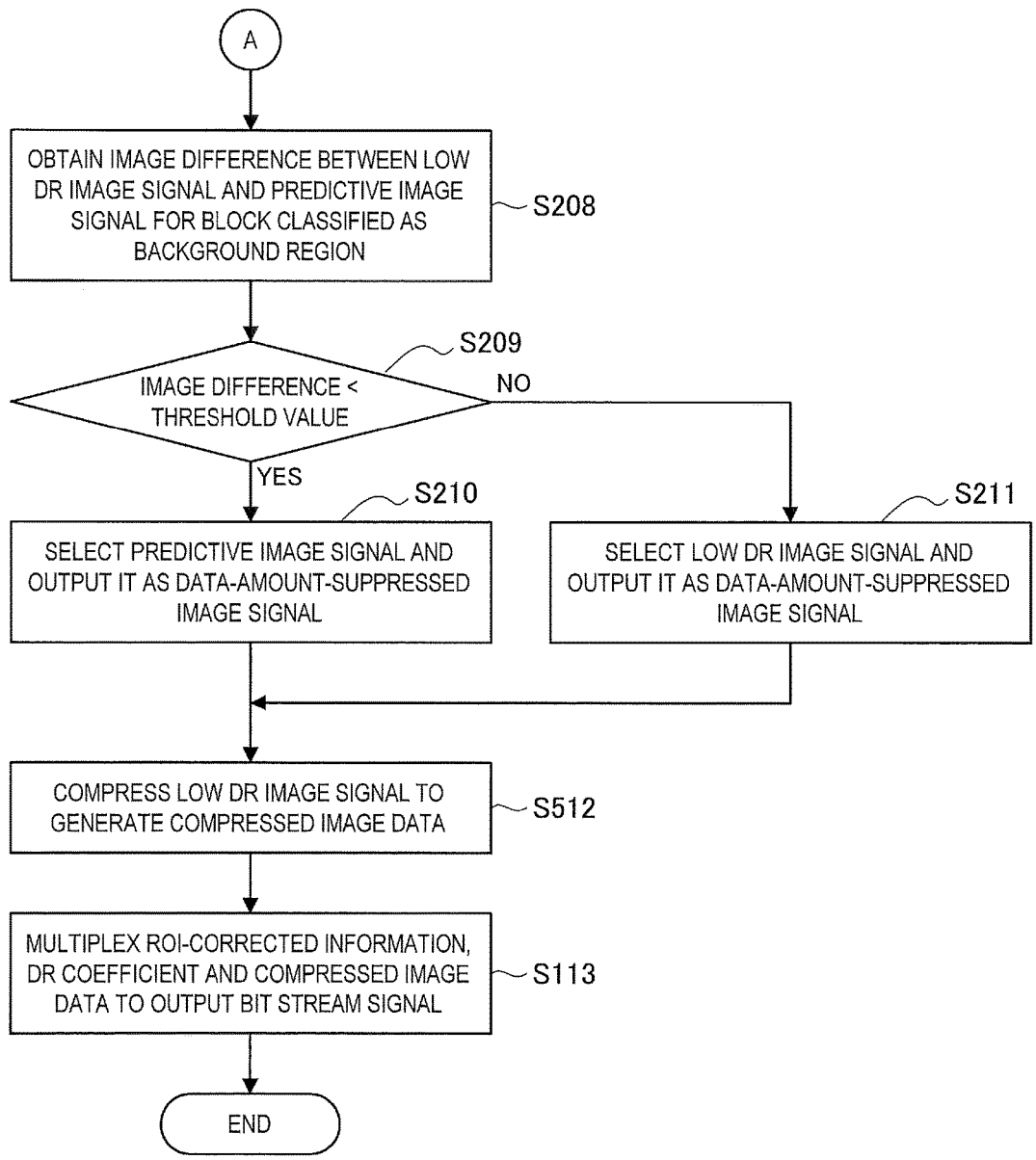
FIG. 7 is a flowchart illustrating an operation of the image coding unit U1 shown in FIG. 5.

FIGS. 6 and 7 are flowcharts illustrating operations of the image coding unit U1 illustrated in FIG. 5.

As illustrated in FIG. 6, in the image coding unit U1, first of all, the ROI correction unit 103 corrects the ROI information D01 by normalizing the ROI information D01 to generate the ROI-corrected information D03 (step S101).

Then, the DR coefficient calculation unit 104 calculates the DR coefficient D04 on the basis of the DR setting value D20 (step S102).

Then, the DRC filter 106 multiplies pixel values corresponding to pixels classified as the background region in the ROI-corrected information D03, in a sequence of pixel values included in the image signal D02, by the DR coefficient D04 to generate the low DR image signal D06 having decompressed dynamic ranges (step S104).

Detailed operations in steps S101, S102 and S104 are the same as those in steps S101, S102 and S104 illustrated in FIG. 2 and thus description thereof is omitted.

Next, the threshold value decision unit 208 calculates a threshold value used in the USP filter 210 on the basis of the threshold setting value D21 supplied from the outside and the DR coefficient D04 supplied from the DR coefficient calculation unit 104 and supplies the threshold value to the USP filter 210 as the threshold value D08 (step S206). The threshold value D08 is a parameter for determining whether pixel values of the low DR image signal D06 are overwritten with pixel values of the predictive image signal D09. The threshold value D08 is a threshold value with respect to an amount indicating a difference between the low DR image signal D06 and the predictive image signal D09. Here, the difference between the low DR image signal D06 and the predictive image signal D09 decreases as the DR coefficient Dc serving as the DR coefficient D04 decreases even if input image signals represent the same image. For this reason, when it is determined whether the pixel values of the low DR image signal D06 are overwritten with the pixel values of the predictive image signal D09 without depending on the DR coefficient Dc, it is desirable that the threshold value D08 follow the DR coefficient Dc to decrease as the DR coefficient Dc decreases. Accordingly, a threshold value T serving as the threshold value D08 is obtained by the following expression using a setting value Tb represented by the threshold setting value D21.

$T=Dc \times Tb$

Further, a configuration in which the threshold setting value D21 is set as the threshold value T is possible. In this case, the threshold value decision unit 208 outputs the threshold setting value D21 input thereto as the threshold value D08.

Then, the buffer 209 accepts and retains the data-amount-suppressed image signal D10 and provides the retained content to the USP filter 210 as the predictive image signal D09 when the coding compression unit 511 compresses the next picture (step S207). Additionally, the predictive image signal D09 may be the immediately previous data-mount-suppressed image signal D10 accepted in the buffer 209 or a signal generated, for example, when motion compensation prediction.

Subsequently, the USP filter 210 obtains, as an image difference SB, the magnitude of a difference between the low DR image signal D06 and the predictive image signal D09 in blocks classified as the background region in the ROI-corrected information D03 from among blocks having any size to which pixel values represented by the low DR image signal D06 belong (step S208). Here, the blocks include not only a block composed of n·m pixels in neighboring n rows×m columns, but also a block composed of only one pixel. In addition, one block may be regarded as a block having the same size as the size of blocks used by the ROI correction unit 103. Further, in determination of whether a block having any size is classified as the background region, there are multiple criteria like the operation of the ROI correction unit 103.

As the aforementioned image difference SB, for example, an index represented by a sum of absolute difference (SAD), mean absolute difference (MAD), sum of squared difference (SSD), mean square error (MSE), MAX or MIN is used. In the case of MAX, the largest value among pixel value differences calculated in a block, that is, differences between the low DR image signal D06 and the predictive image signal D09, is regarded as an image difference SB of the block. Meanwhile, in the case of MIN, the smallest value among pixel value differences calculated in a block is regarded as an image difference SB of the block. While the aforementioned index equally evaluates a DC component and an AC component, the image difference SB as an AC component may be calculated by generating a block by subtracting, from each block, the mean of pixel values in the corresponding block and evaluating SAD, MAD, SSD, MSE, MAX or MIN for blocks from which the mean has been subtracted in advance in the low DR image signal D06 and the predictive image signal D09.

Subsequently, the USP filter 210 determines whether the image difference SB is less than the threshold value D08 for each block (step S209). For a block determined to have an image difference SB less than the threshold value D08 in step S209, the USP filter 210 selects the predictive image signal D09 between the low DR image signal D06 and the predictive image signal D09 and supplies the predictive image signal D09 to the coding compression unit 511 as the data-amount-suppressed image signal D10 (step S210).

On the other hand, for a block determined to have an image difference SB equal to or greater than the threshold value D08 in step S209, the USP filter 210 selects the low DR image signal D06 between the low DR image signal D06 and the predictive image signal D09 and supplies the low DR image signal D06 to the coding compression unit 511 as the data-amount-suppressed image signal D10 (step S211).

After execution of step S210 or S211, the coding compression unit 511 compresses the low DR image signal D06 using an image coding scheme such as JPEG, H.264/MPEG-4 AVC or H.265/MPEG-H HEVC to generate the compressed image data D11 (step S512).

Then, the bit stream transmitter 112 multiplexes information such as the ROI-corrected information D03, the DR coefficient D04 and the compressed image data D11 to generate the bit stream signal D12 and outputs the bit stream signal D12 to the outside (step S113).

As described above, in the image processing system P1 illustrated in FIG. 5, the compression target selection unit (threshold value decision unit 208 and USP filter 210) and the buffer 209 described below are provided between the DRC filter 106 and the coding compression unit 511.

The compression target selection unit selects one of the low DR image signal D06 and the predictive image signal D09 supplied from the DRC filter 106 and supplies the selected one as the data-amount-suppressed image signal D10 to the coding compression unit 511. Here, the buffer 209 accepts and retains the data-amount-suppressed image signal D10 and supplies the retained data-amount-suppressed image signal D10 to the compression target selection unit as the predictive image signal D09 after one picture period.

Specifically, first of all, the compression target selection unit obtains an image difference (SB) between the low DR image signal D06 and the predictive image signal D09 in the background region other than the ROI represented by the ROI-corrected information D03 (S208). Here, when the image difference SB is less than a predetermined threshold value (D04), the compression target selection unit selects the predictive image signal D09 and supplies the predictive image signal D09 to the coding compression unit 511 as the data-amount-suppressed image signal D10 (S210).

Additionally, the predictive image signal D09 is an image signal that was a compression target of the coding compression unit 511 one picture period before, as described above. Accordingly, here, the coding compression unit 511 is provided with the data-amount-suppressed image signal D10 representing the same image in two pictures and thus transitions to the skip mode. Since the coding compression unit 511 codes the data-amount-suppressed image signal D10 in such a manner that transmission of redundant differential information is limited in the skip mode, the information amount is reduced. Here, the threshold value (D04) increases as the threshold setting value D21 supplied from the outside to set the threshold value (D04) increases, and the frequency of transitioning of the coding compression unit 511 to the skip mode increases.

In short, in the image processing system P1 illustrated in FIG. 5, the frequency of transitioning of the coding compression unit 511 to the skip mode is increased by providing the compression target selection units (208 and 210) and the buffer (209), thereby reducing the information amount.

Embodiment 3

Figure 8:
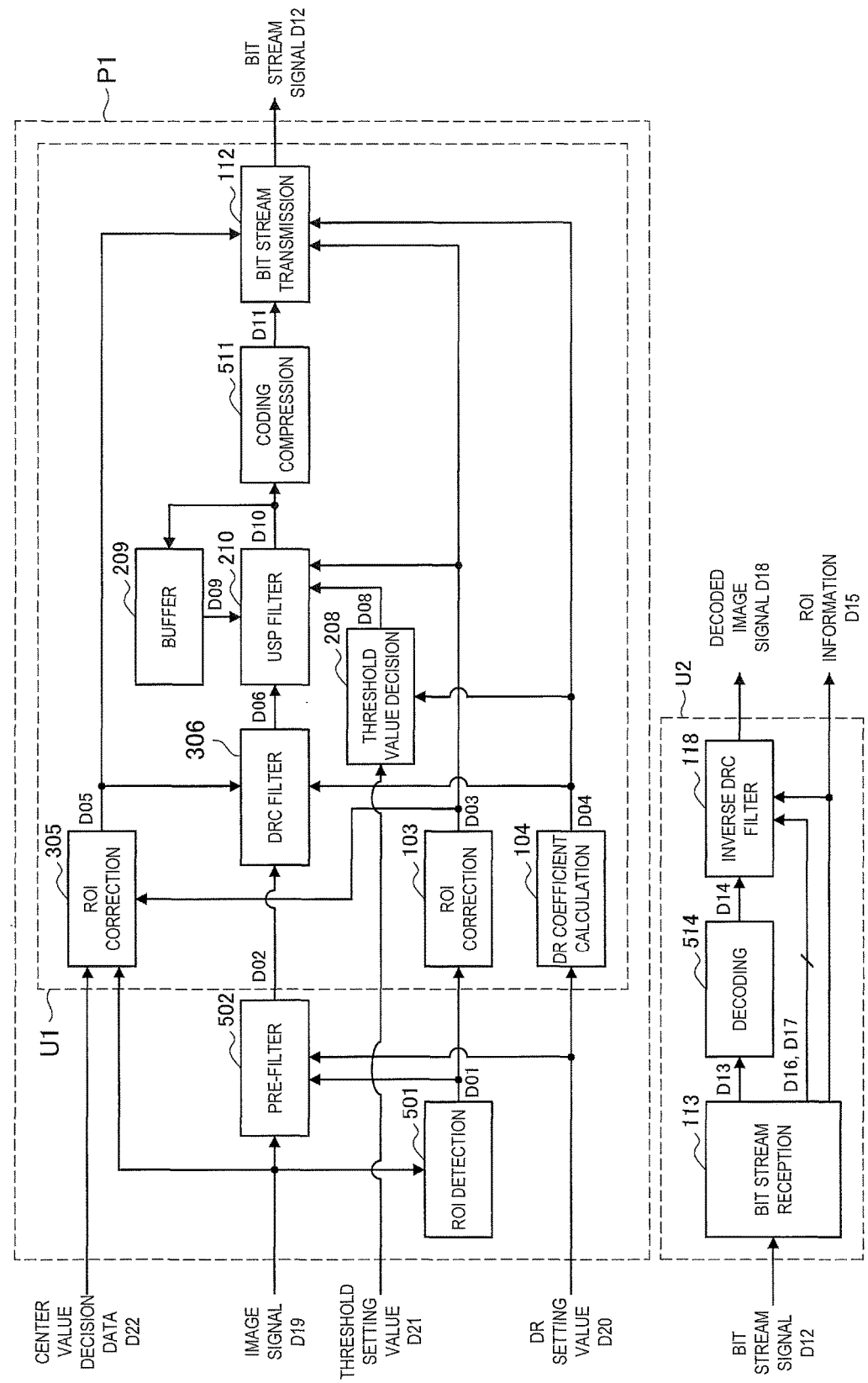
FIG. 8 is a block diagram illustrating a configuration of a third embodiment of the image processing system P1 and the image decoding unit U2.

FIG. 8 is a block diagram illustrating a configuration of a third embodiment of the image processing system P1 and the image decoding unit U2. The configuration of the image processing system P1 illustrated in FIG. 8 is the same as that illustrated in FIG. 5 except that a DRC filter 306 is employed instead of the DRC filter 106, a bit stream transmitter 312 is employed instead of the bit stream transmitter 112, and a center value decision unit 305 supplied with center value decision data D22 is newly provided.

Accordingly, configurations of the center value decision unit 305, the DRC filter 306 and the bit stream transmitter 312 will be mostly described.

The center value decision unit 305 decides a center value when the DRC filter 306 compresses a dynamic range of an image signal, on the basis of the center value decision data D22 supplied from the outside or the image signal D19 and the ROI-corrected information D03, and supplies a center value D05 indicating the decided center value to the DRC filter 306 and the bit stream transmitter 312.

The DRC filter 306 multiplies pixel values corresponding to pixels classified as the background region in the ROI-corrected information D03, in the sequence of pixel values represented by the image signal D02, by the DR coefficient D04 to compress the dynamic range with the center value D05 as a center, generating the low DR image signal D06. Here, the value indicated by the DR coefficient D04 is less than 1. Accordingly, the dynamic range of each of the pixel values corresponding to the background region is compressed at a compression ratio based on the DR coefficient D04 through multiplication of the pixel values corresponding to the pixels classified as the background region by the DR coefficient D04. On the other hand, with respect to a sequence of pixel values corresponding to pixels classified as the ROI, the DRC filter 106 outputs the sequence of pixel values as the low DR image signal D06. The DRC filter 306 supplies the low DR image signal D06 to the USP filter 210.

The bit stream transmitter 312 multiplexes the center value D05 with the ROI-corrected information D03, the DR coefficient D04 and the compressed image data D11 to generate the bit stream signal D12 and outputs the bit stream signal D12 to the outside.

In addition, the image decoding unit U2 illustrated in FIG. 8 includes a bit stream receiver 318, a decoder 514 and an inverse DRC filter 313.

The bit stream receiver 318 receives the bit stream signal D12 and extracts the compressed image data, ROI information, DR coefficient and center value D05 from the bit stream signal D12. The bit stream receiver 318 supplies the extracted compressed image data to the decoder 514 as compressed image data D13. In addition, the bit stream receiver 318 supplies the extracted ROI information to the inverse DRC filter 313 as ROI information D15 and outputs the ROI information D15 to the outside. Further, the bit stream receiver 318 supplies the extracted DR coefficient to the inverse DRC filter 313 as a DR coefficient D16 and supplies the extracted center value to the inverse DRC filter 313 as a center value D17.

The decoder 514 performs decoding processing corresponding to the image coding scheme employed by the coding compression unit 511, such as JPEG, H.264/MPEG-4 AVC or H.265/MPEG-H HEVC, on the compressed image data D13 to decompress the compressed state thereof, thereby generating a data-amount-suppressed image signal D14. The decoder 514 supplies the data-amount-suppressed image signal D14 to the inverse DRC filter 313.

The inverse DRC filter 313 multiplies pixel values classified as the background region in the ROI information D15, in the sequence of pixel values included in the data-amount-suppressed image signal D14, by a reciprocal of the DR coefficient D16 with the center value D17 as a center to generate a decoded image signal D18 having decompressed dynamic ranges and outputs the decoded image signal D18 to the outside.

Hereinafter, detailed operations with respect to the configuration illustrated in FIG. 8 will be described.

Figure 9:
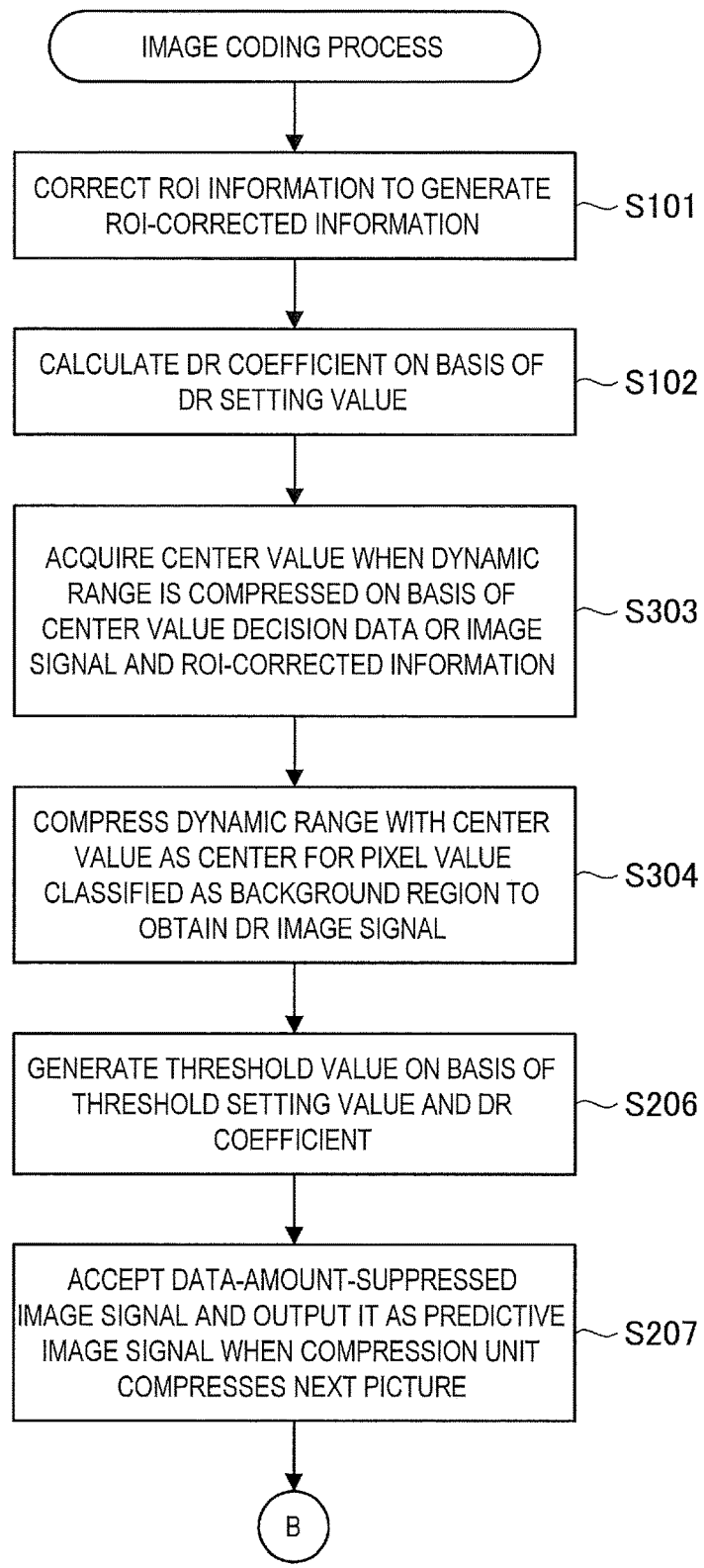
FIG. 9 is a flowchart illustrating an operation of the image coding unit U1 shown in FIG. 8.
Figure 10:
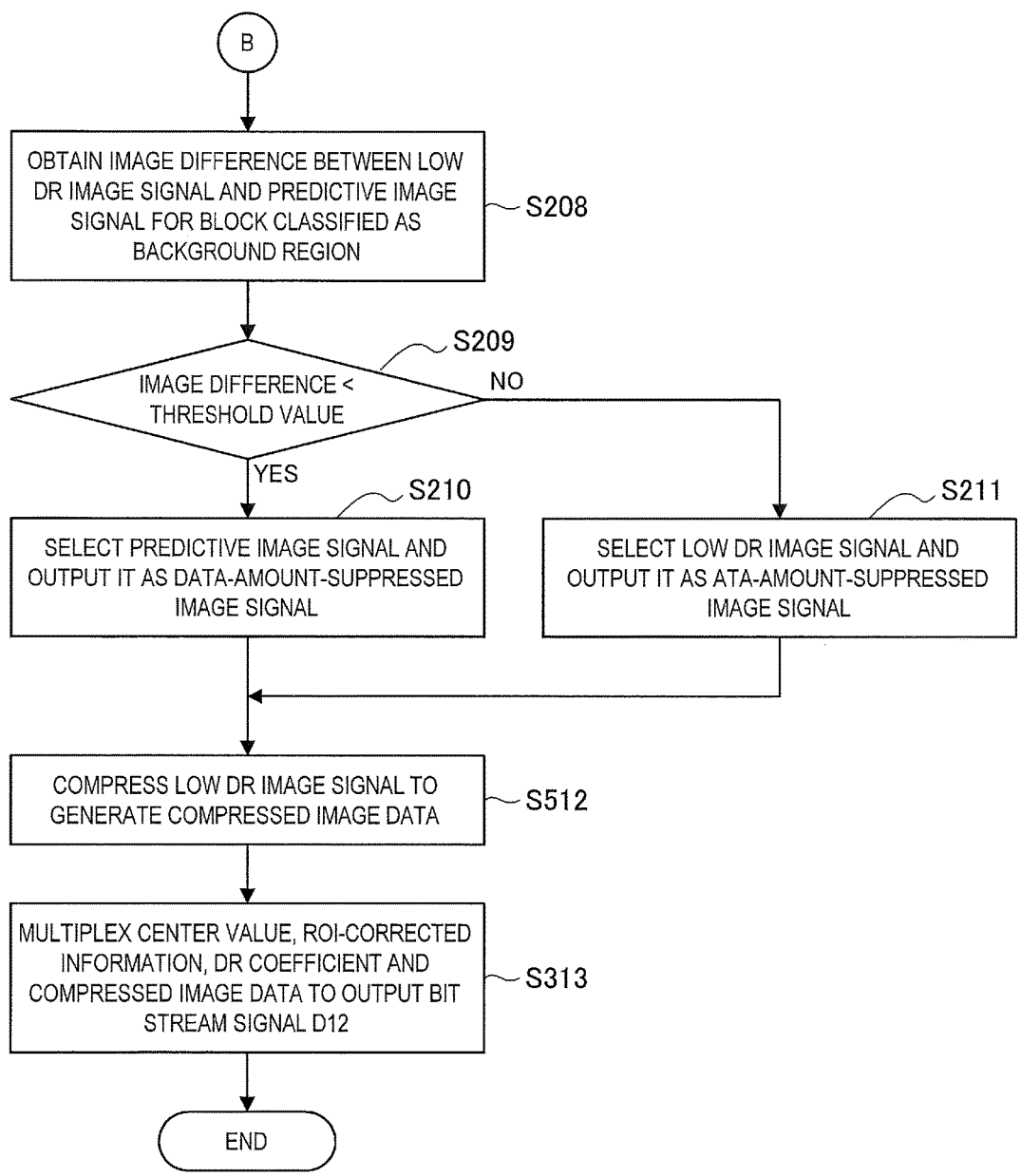
FIG. 10 is a flowchart illustrating an operation of the image coding unit U1 shown in FIG. 8.

FIGS. 9 and 10 are flowcharts illustrating operations of the image coding unit U1 illustrated in FIG. 8.

As illustrated in FIG. 9, in the image coding unit U1, first of all, the ROI correction unit 103 corrects the ROI information D01 by normalizing the ROI information D01 to generate the ROI-corrected information D03 (step S101).

Then, the DR coefficient calculation unit 104 calculates the DR coefficient D04 on the basis of the DR setting value D20 (step S102).

Detailed operations in steps S101 and S102 are the same as those in steps S101 and S102 illustrated in FIG. 2 or 6 and thus description thereof is omitted.

Subsequently, the center value decision unit 305 decides a center value when the DRC filter 306 compresses a dynamic range of an image signal on the basis of the center value decision data D22 supplied from the outside or the image signal D19 and the ROI-corrected information D03 and obtains a center value D05 indicating the decided center value (step S303). That is, the center value decision unit 305 obtains the center value when the dynamic range is compressed for each block having any size by performing one of center value decision processes A1 to A4 below. Additionally, the size of one block may correspond to all pixels in one picture.

(Center Value Decision Process A1)

In the center value decision process A1, the center value decision unit 305 regards the center value decision data D22 supplied from the outside as the center value D05. For example, when a most notable "color" is decided in a scene of interest, a time interval in the scene or the like while an image is viewed, the center value decision data D22 that indicates values of red, green and blue components of the "color" as center values (red component, green component and blue component) is to the image processing system P1. Accordingly, the center value decision unit 305 regards the center value decision data D22 indicating the notable "color" as center values (red component, green component and blue component) as the center value D05 and supplies the center value D05 to the DRC filter 306 and the bit stream transmitter 312.

(Center Value Decision Process A2)

In the center value decision process A2, the center value decision unit 305 regards a representative value of a pixel value group composed of pixel values corresponding to pixels included in a block having any size of the image signal D19 as the center value D05. For example, the center value decision unit 305 calculates the mean, median or mode of a pixel value group in each block and supplies the center value D05 indicating a calculation result as a center value to the DRC filter 306 and the bit stream transmitter 312.

(Center Value Decision Process A3)

In the center value decision process A3, the center value decision unit 305 extracts pixels belonging to the background region from pixels included in each block of the image signal D19 on the basis of the ROI-corrected information D03 and regards a representative value of a pixel value group composed of pixel values corresponding to the pixels belonging to the background region as the center value D05. For example, the center value decision unit 305 calculates the mean, median or mode of a pixel value group corresponding to pixels belonging to the background region in each block and supplies the center value D05 indicating a calculation result as a center value to the DRC filter 306 and the bit stream transmitter 312.

(Center Value Decision Process A4)

In the center value decision process A4, the center value decision unit 305 extracts pixels belonging to the ROI from pixels included in each block of the image signal D19 on the basis of the ROI-corrected information D03 and regards a representative value of a pixel value group composed of pixel values corresponding to the pixels belonging to the ROI as the center value D05. For example, the center value decision unit 305 calculates the mean, median or mode of pixel values corresponding to the pixels belonging to the ROI in each block and supplies the center value D05 indicating a calculation result as a center value to the DRC filter 306 and the bit stream transmitter 312.

In this manner, quality deterioration in the background region is limited by using a representative value (mean, median or mode) of pixel values of pixels belonging to the ROI as a center value when the DRC filter 306 compresses the dynamic range of the image signal D02, even when a region surrounding the ROI which should be originally included in the ROI is regarded as the background due to erroneous detection.

After execution of step S303, the DRC filter 306 compresses the dynamic range using the center value D05 as a center by multiplying pixel values corresponding to pixels classified as the background region in the ROI-corrected information D03, in the sequence of pixel values represented by the image signal D02, by the DR coefficient D04 to obtain the low DR image signal D06 (step S304). Specifically, when a pixel value before dynamic range compression is Pb, a pixel value after dynamic range compression is Pa, and the center value D05 is C, the DRC filter 306 obtains the pixel value Pa after dynamic range compression in accordance with the following expression, for example.

$$Pa=(Pb-C) \times Dc + C$$

Dc: DR coefficient

That is, the DRC filter 306 decreases pixel values greater than the center value D05 and increases pixel values equal to or less than the center value D05 to obtain the low DR image signal D06 composed of a sequence of pixel values having dynamic ranges compressed using the center value D05 as a center. On the other hand, for a sequence of pixel values corresponding to pixels classified as the ROI, the DRC filter 306 outputs the sequence of pixel values as the low DR image signal D06.

After execution of step S304, the threshold value decision unit 208 of the image coding unit U1 illustrated in FIG. 8 calculates a threshold value used in the USP filter 210 on the basis of the threshold setting value D21 supplied from the outside and the DR coefficient D04 supplied from the DR coefficient calculation unit 104 and provides the threshold value to the USP filter 210 as a threshold value D08 (step S206).

Subsequently, the buffer 209 accepts and retains the data-amount-suppressed image signal D10 and supplies the retained content to the USP filter 210 as the predictive image signal D09 when the coding compression unit 511 compresses the next picture (step S207).

Then, the USP filter 210 obtains, as an image difference SB, the magnitude of a difference between the low DR image signal D06 and the predictive image signal D09 in a block classified as the background region in the ROI-corrected information D03 from among blocks having any size to which pixel values represented by the low DR image signal D06 belong (step S208).

Subsequently, the USP filter 210 determines whether the image difference SB is less than the threshold value D08 for each block (step S209). For a block determined to have an image difference SB less than the threshold value D08 in step S209, the USP filter 210 selects the predictive image signal D09 between the low DR image signal D06 and the predictive image signal D09 and supplies the predictive image signal D09 to the coding compression unit 511 as the data-amount-suppressed image signal D10 (step S210).

On the other hand, for a block determined to have an image difference SB equal to or greater than the threshold value D08 in step S209, the USP filter 210 selects the low DR image signal D06 between the low DR image signal D06 and the predictive image signal D09 and supplies the low DR image signal D06 to the coding compression unit 511 as the data-amount-suppressed image signal D10 (step S211).

Detailed operations in steps S206 to S211 illustrated in FIGS. 9 and 10 are the same as those described in steps S206 to S211 illustrated in FIGS. 6 and 7 and thus description thereof is omitted.

After execution of step S210 or S211, the coding compression unit 511 compresses the low DR image signal D06 using an image coding scheme such as JPEG, H.264/MPEG-4 AVC or H.265/MPEG-H HEVC to generate the compressed image data D11 (step S512).

Then, the bit stream transmitter 112 multiplexes information such as the center value D05, the ROI-corrected information D03, the DR coefficient D04 and the compressed image data D11 to generate the bit stream signal D12 and outputs the bit stream signal D12 to the outside (step S313).

Hereinafter, the operation of the image decoding unit U2 receiving the bit stream signal D12 and performing image decoding processing on the bit stream signal D12 will be described.

Figure 11:
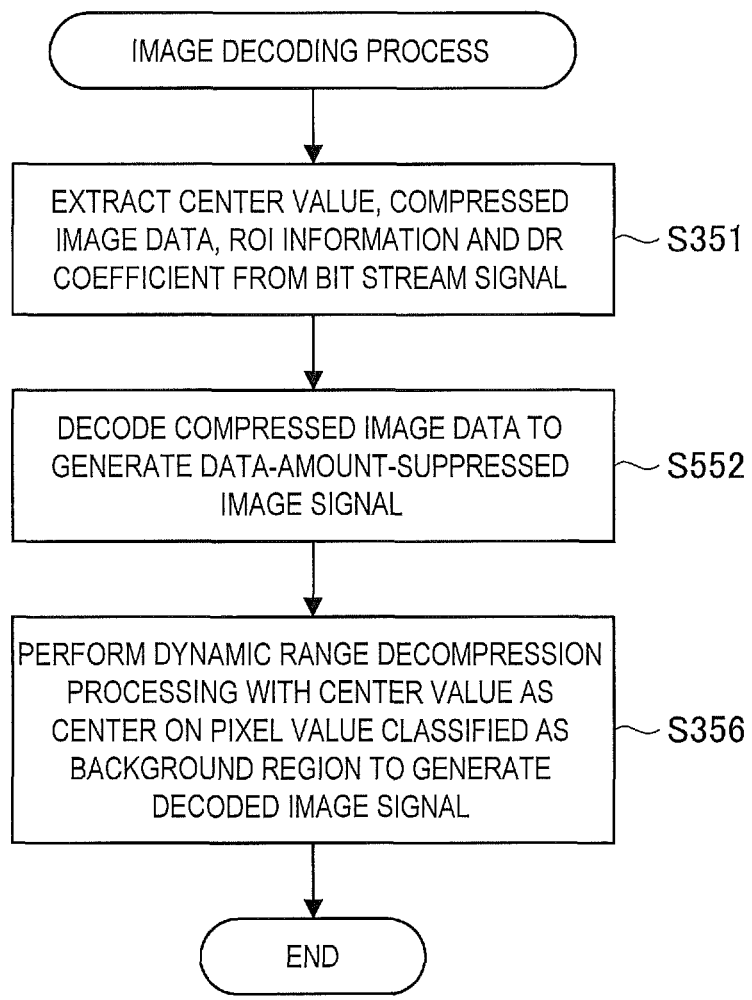
FIG. 11 is a flowchart illustrating an operation of the image decoding unit U2 shown in FIG. 8.

FIG. 11 is a flowchart illustrating an operation of the image decoding unit U2 illustrated in FIG. 8. As illustrated in FIG. 11, in the image decoding unit U2, first of all, the bit stream receiver 318 receives the bit stream signal D12, extracts a center value, compressed image data, ROI information and a DR coefficient from the bit stream signal D12 and outputs the center value, the compressed image data, the ROI information and the DR coefficient as a center value D17, compressed image data D13, ROI information D15 and a DR coefficient D16, respectively (step S351).

Then, the decoder 514 decodes the compressed image data D13 using an image decoding scheme such as H.264/MPEG-4 AVC to generate the data-amount-suppressed image signal D14 (step S552).

Subsequently, the inverse DRC filter 313 multiplies pixel values corresponding to pixels classified as the background region on the basis of the ROI information D15, in a sequence of pixel values included in the data-amount-suppressed image signal D14, by a reciprocal of the DR coefficient D16 with the center value D17 as a center, to generate a decoded image signal D18 having decompressed dynamic ranges.

Specifically, when the center value D17 is V and a pixel value before dynamic range decompression is Qb, the inverse DRC filter 313 obtains a pixel value Qa after dynamic range decompression in accordance with the following expression, for example.

$$Qa=(Qb-V)\times(1/Dc)+V$$

That is, the inverse DRC filter 313 regards Qa as the pixel value after decompression for pixel values corresponding to pixels classified as the background region and regards Qb as the pixel value after decompression for pixels classified as the ROI. Then, the inverse DRC filter 118 outputs the decoded image signal D18 including a sequence of pixel values (Qa and Qb) after decompression.

As described above, the center value decision unit 305 that sets a center value (D05) when the DRC filter 306 performs dynamic range compression is provided in the image processing system P1 illustrated in FIG. 8. Further, the center value is a pixel value representing a color (red component, green component or blue component) for which image quality deterioration needs to be prevented, that is, a visually important color. The DRC filter 306 performs dynamic range compression using the center value (D05) as a center by decreasing a pixel value represented by the image signal D02 when the pixel value is greater than the center value and increasing a pixel value represented by the image signal D02 when the pixel value is equal to or less than the center value D05. Accordingly, although a quantization error involved in compression processing is generated for pixel values other than the center value, a quantization error involved in compression processing is not generated for pixel values having the center value, and thus image quality deterioration with respect to visually important colors can be limited.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, although FIGS. 1, 5 and 8 illustrate configurations in which the image coding unit U1 and the image decoding unit U2 are normally combined, the image coding unit U1 alone equally reduces an information amount. Furthermore, the information amount is equally reduced even when a combination of the image coding unit U1 illustrated in FIG. 8 and the image decoding unit U2 illustrated in FIG. 1 is employed.

In addition, while the center value decision unit 305 is added to the compression target selection unit (the threshold value decision unit 208, the buffer 209 and the USP filter 210) illustrated in FIG. 5 in the configuration illustrated in FIG. 8, a configuration in which the compression target selection unit is excluded may be employed.

Further, although dynamic range compression is performed for the background region while dynamic range compression is not performed for the ROI in the embodiments illustrated in FIGS. 1, 5 and 8, dynamic range compression processing may be performed for the ROI at a different compression ratio from that of the background region.

Moreover, while the DR coefficient D04 is less than 1 in the above-described embodiments, an information amount with respect to the background region is reduced even when the DR coefficient D04 is 1.0 in the configuration illustrated in FIG. 5. A configuration in which the DR coefficient D04 is 1.0 is equivalent to a configuration in which the image signal D02 is input to the USP filter 210. In other words, a configuration in which the DRC filter 106 is excluded from the configuration of the image coding unit U1 illustrated in FIG. 5 and the image signal D02 is directly supplied to the USP filter 210 may be employed.

What is claimed is:

1. An image processing system that compresses and transmits an input image signal including pixel values corresponding to respective pixels, comprising:
    a dynamic range compression unit configured to compress, by a predetermined coefficient, a dynamic range of each of the pixel values corresponding to a background region other than a region of interest (ROI) designated as a desired region for the pixel values in an image based on the input image signal, to generate a low dynamic range image signal;
    a coding compression unit configured to compress the low dynamic range image signal in accordance with a predetermined image coding scheme to generate compressed image data; and
    a bit stream transmitter configured to output a bit stream signal including ROI information indicating a position of the ROI in the image, the predetermined coefficient and the compressed image data.

2. The image processing system according to claim 1, comprising:
    an ROI detection unit configured to detect a region in which a predetermined object is displayed in the image based on the input image signal as the ROI and to generate the ROI information indicating the position of the ROI in the image,
    wherein the dynamic range compression unit regards a region other than the ROI detected by the ROI detection unit in the image as the background region.

3. The image processing system according to claim 2, comprising:
    an ROI correction unit configured to correct the ROI information,
    wherein the ROI correction unit corrects all pixels belonging to a block into pixels belonging to the ROI when predetermined N or more pixels among the pixels belonging to the block belong to the ROI, for each block composed of neighboring pixels in the image.

4. The image processing system according to claim 1, comprising:
    a coefficient calculation unit configured to receive a dynamic range setting value for designating a dynamic range and to calculate the predetermined coefficient on the basis of the dynamic range setting value.

5. The image processing system according to claim 1, comprising:
    a compression target selection unit configured to select one of the low dynamic range image signal and a predictive image signal and to supply the selected one to the coding compression unit as a data-amount-suppressed image signal; and
    a buffer configured to accept and retain the data-amount-suppressed image signal and to supply the retained data-amount-suppressed image signal to the compression target selection unit as the predictive image signal after one picture period,
    wherein the coding compression unit compresses the data-amount-suppressed image signal in accordance with the predetermined image coding scheme.

6. The image processing system according to claim 5, wherein the compression target selection unit determines whether a difference between the low dynamic range image signal and the predictive image signal is less than a predetermined threshold value for blocks classified as the background region from among blocks each composed of neighboring pixels in the image, selects the predictive image signal for a block for which the difference is determined to be less than the predetermined threshold value, and selects the low dynamic range image signal for a block for which the difference is determined to be equal to or greater than the predetermined threshold value.

7. The image processing system according to claim 6, comprising:
    a threshold value decision unit configured to receive a threshold setting value indicating a threshold value to be set and to calculate the predetermined threshold value on the basis of the threshold setting value and the predetermined coefficient.

8. The image processing system according to claim 1, wherein the dynamic range compression unit generates the low dynamic range image signal by multiplying pixel values of pixels classified as the background region from among the pixel values by the predetermined coefficient.

9. The image processing system according to claim 1, wherein, when a pixel value of a pixel classified as the background region is Pb, a pixel value after dynamic range compression is Pa, the predetermined coefficient is Dc, and a center value of dynamic range compression is C, the dynamic range compression unit calculates the pixel value Pa after dynamic range compression in accordance with the following expression $$Pa=(Pb-C) \times Dc+C.$$

10. The image processing system according to claim 9, comprising:
    a center value decision unit configured to receive center value decision data for designating a center value of a dynamic range and to decide the center value C on the basis of the input image signal, the center value decision data or information about the ROI,
    wherein the dynamic range compression unit compresses a dynamic range with the center value C as a center, and wherein the bit stream transmitter outputs a bit stream signal including the center value C along with the information about the ROI, the predetermined coefficient and the compressed image data.

11. The image processing system according to claim 10, wherein the center value decision unit regards the center value designated by the center value decision data as the center value C.

12. The image processing system according to claim 10, wherein the center value decision unit regards a representative value of a pixel value group composed of pixel values corresponding to respective pixels included in a corresponding block, as the center value C for each block in the input image signal.

13. The image processing system according to claim 10, wherein the center value decision unit regards a representative value of a pixel value group of pixels belonging to the background region from among pixels included in a corresponding block as the center value C for each block in the input image signal.

14. The image processing system according to claim 10, wherein the center value decision unit regards a representative value of a pixel value group of pixels belonging to the ROI from among pixels included in a corresponding block as the center value C for each block in the input image signal.

15. An image processing system that compresses and transmits an input image signal including pixel values corresponding to respective pixels, comprising:
a dynamic range compression unit configured to compress, by a predetermined coefficient, a dynamic range of each of the pixel values corresponding to a background region other than a region of interest (ROI) designated as a desired region for the pixel values in an image based on the input image signal, to generate a low dynamic range image signal;
a compression target selection unit configured to select one of the low dynamic range image signal and a predictive image signal and to output the selected one as a data-amount-suppressed image signal;
a buffer configured to accept and retains the data-amount-suppressed image signal and to supply the retained data-amount-suppressed image signal to the compression target selection unit as the predictive image signal after one picture period;
a coding compression unit configured to compress the data-amount-suppressed image signal in accordance with a predetermined image coding scheme to generate compressed image data; and
a bit stream transmitter configured to output a bit stream signal including ROI information indicating a position of the ROI in the image, the predetermined coefficient and the compressed image data.

16. The image processing system according to claim 15, wherein the compression target selection unit determines whether a difference between the low dynamic range image signal and the predictive image signal is less than a predetermined threshold value for blocks classified as the background region from among blocks each composed of neighboring pixels in the image, selects the predictive image signal for a block for which the difference is determined to be less than the predetermined threshold value, and selects the low dynamic range image signal for a block for which the difference is determined to be equal to or greater than the predetermined threshold value.

* * * * *